(12) United States Patent
Bhandari et al.

(10) Patent No.: US 11,012,353 B2
(45) Date of Patent: May 18, 2021

(54) USING IN-BAND OPERATIONS DATA TO SIGNAL PACKET PROCESSING DEPARTURES IN A NETWORK

(71) Applicant: Cisco Technology, Inc., San Jose, CA (US)

(72) Inventors: Shwetha Subray Bhandari, Bangalore (IN); Nagendra Kumar Nainar, Morrisville, NC (US); Carlos M. Pignataro, Cary, NC (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 29 days.

(21) Appl. No.: 16/231,319

(22) Filed: Dec. 21, 2018

(65) Prior Publication Data

US 2020/0145331 A1    May 7, 2020

(30) Foreign Application Priority Data

Nov. 2, 2018    (IN) ............................. 201841041564

(51) Int. Cl.
*H04L 12/741*    (2013.01)
*H04L 29/06*    (2006.01)
(Continued)

(52) U.S. Cl.
CPC ............ *H04L 45/74* (2013.01); *H04L 9/0861* (2013.01); *H04L 9/3218* (2013.01); *H04L 45/22* (2013.01);
(Continued)

(58) Field of Classification Search
CPC ....... H04L 45/74; H04L 45/22; H04L 9/0861; H04L 9/3218; H04L 49/3009; H04L 69/161
See application file for complete search history.

(56) References Cited

U.S. PATENT DOCUMENTS

| 10,187,209 B2 | 1/2019 | Dara et al. |
| 10,211,987 B2 | 2/2019 | Dara et al. |
| 10,237,068 B2 | 3/2019 | Dara et al. |

(Continued)

OTHER PUBLICATIONS

Deering et al., "Internet Protocol, Version 6 (IPv6) Specification," Dec. 1998, RFC 2460, The Internet Society, Reston, VA, USA (thirty-nine pages).

(Continued)

*Primary Examiner* — Ajay Cattungal
(74) *Attorney, Agent, or Firm* — The Law Office of Kirk D. Williams

(57) ABSTRACT

In one embodiment, nodes use in-band operations data (e.g., carried in iOAM data field(s)) to signal departures in the processing of a packet in a network. A "departure" refers to a divergence or deviation, as from an established rule, plan, or procedure. Departures include, but are not limited to, sending a packet over a backup path (thus, a departure/deviation from sending over a primary path); offload processing of a packet (thus, a departure/deviation from processing of a packet by an application processing apparatus); and exception or punting/slow/software path processing of a packet (thus, a departure/deviation from normal or fast/hardware path processing of a packet). In one embodiment, a proof of transit validation apparatus uses departure information to select among multiple possible verification secrets, with the selected verification secret used in validation processing with a cumulative secret value obtained from the packet.

22 Claims, 7 Drawing Sheets

(51) Int. Cl.
  *H04L 9/08*    (2006.01)
  *H04L 12/707*  (2013.01)
  *H04L 9/32*    (2006.01)
  *H04L 12/935*  (2013.01)
(52) U.S. Cl.
  CPC ........ *H04L 49/3009* (2013.01); *H04L 69/161* (2013.01)

(56) References Cited

U.S. PATENT DOCUMENTS

| | | | |
|---|---|---|---|
| 10,348,648 B2 | 7/2019 | Pignataro et al. | |
| 2008/0162753 A1* | 7/2008 | Liu | G06F 13/385 710/74 |
| 2011/0317551 A1* | 12/2011 | Hachiya | H04L 47/2458 370/228 |
| 2015/0016286 A1* | 1/2015 | Ganichev | H04L 45/586 370/252 |
| 2015/0016469 A1* | 1/2015 | Ganichev | H04L 49/90 370/429 |
| 2015/0271069 A1* | 9/2015 | Retana | H04L 69/40 370/392 |
| 2016/0315819 A1 | 10/2016 | Dara et al. | |
| 2016/0315850 A1 | 10/2016 | Dara et al. | |
| 2016/0315921 A1 | 10/2016 | Dara et al. | |
| 2017/0339072 A1 | 11/2017 | Pignataro et al. | |
| 2018/0331890 A1* | 11/2018 | Song | H04L 41/08 |
| 2019/0349290 A1 | 11/2019 | Pignataro et al. | |

OTHER PUBLICATIONS

Deering et al., "Internet Protocol, Version 6 (IPv6) Specification," Jul. 2017, RFC 8200, The Internet Society, Reston, VA, USA (forty-two pages).
Carpenter et al., "Transmission and Processing of IPv6 Extension Headers," Dec. 2013, RFC 7045, The Internet Society, Reston, VA, USA (ten pages).
Elkins et al., "IPv6 Performance and Diagnostic Metrics (PDM) Destination Option," Sep. 2017, RFC 8250, The Internet Society, Reston, VA, USA (thirty pages).
Brockners et al., "Requirements for In-situ OAM," Mar. 13, 2017, draft-brockners-inband-oam-requirements-03, The Internet Society, Reston, VA, USA (twenty-four pages).
Brockners et al., "Data Fields for In-situ OAM," Jul. 2, 2017, draft-brockners-inband-oam-data-07, The Internet Society, Reston, VA, USA (twenty-nine pages).
Brockners et al., "Encapsulations for In-situ OAM Data," Jul. 2, 2017, draft-brockners-inband-oam-transport-05, The Internet Society, Reston, VA, USA (thirty pages).
Brockners et al., "Geneve encapsulation for In-situ OAM Data," Jun. 27, 2018, draft-brockners-ippm-ioam-geneve-01, The Internet Society, Reston, VA, USA (ten pages).
Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).
Brockners et al., "Data Fields for In-situ OAM," Oct. 30, 2017, draft-ietf-ippm-ioam-data-01, The Internet Society, Reston, VA, USA (twenty-nine pages).
Brockners et al., "Data Fields for In-situ OAM," Jun. 27, 2018, draft-ietf-ippm-ioam-data-03, The Internet Society, Reston, VA, USA (thirty-five pages).
Song and Zhou, "In-situ OAM Data Type Extension," Apr. 16, 2018, draft-song-ippm-ioam-data-extension-01, The Internet Society, Reston, VA, USA (seven pages).
Bhandari et al., "In-situ OAM IPv6 Options," Jun. 29, 2018, draft-ioametal-ippm-6man-ioam-ipv6-options-00, The Internet Society, Reston, VA, USA (nine pages).
Weis et al., "GRE Encapsulation for In-situ OAM Data," Mar. 3, 2018, draft-weis-ippm-ioam-gre-00, The Internet Society, Reston, VA, USA (nine pages).
Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).
Previdi et al., "IPv6 Segment Routing Header (SRH)," Mar. 13, 2017, draft-ietf-6man-segment-routing-header-06, The Internet Society, Reston, VA, USA (thirty-five pages).
Baker and Bonica, "IPv6 Hop-by-Hop Options Extension Header," Mar. 16, 2016, draft-ietf-6man-hbh-header-handling-03, The Internet Society, Reston, VA, USA (ten pages).
Filsfils et al, "IPv6 Segment Routing Header (SRH)," Jun. 28, 2018, draft-ietf-6man-segment-routing-header-14, The Internet Society, Reston, VA, USA (twenty-nine pages).
"In-band OAM for IPv6," IPv6 Network Management Configuration Guide, Cisco IOS Release 15M&T, Jan. 26, 2018, Cisco Systems, Inc., San Jose, CA (thirty-six pages).
IPv6 Network Management Configuration Guide, Cisco IOS Release 15M&T, Nov. 21, 2012, Cisco Systems, Inc., San Jose, CA (ninety-six pages).
"Encapsulation Techniques: Generic Network Virtualization Encapsulation, VXLAN Generic Protocol Extension, and Network Service Header," White Paper, 2014, Cisco Systems, Inc., San Jose, CA (three pages).
Tom Herbert, "Re: [nvo3] [ippm] [Int-area] encapsulation of IOAM data in various protocols—follow up from WG discussion in London," Apr. 12, 2018, www.mail-archive.com/nvo3@ietf.org/msg05579.html, The Internet Society, Reston, VA, USA (six pages).
Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).
Sajassi et al., "BGP MPLS-Based Ethernet VPN," Feb. 2015, RFC 7432, The Internet Society, Reston, VA, USA (fifty-six pages).
J. Touch, "Recommendations on Using Assigned Transport Port Numbers," Aug. 2015, RFC 7605, The Internet Society, Reston, VA, USA (twenty-four pages).
Maino et al., "Generic Protocol Extension for VXLAN," Apr. 30, 2018, draft-ietf-nvo3-vxlan-gpe-06, The Internet Society, Reston, VA, USA (seventeen pages).
"Cisco Data Center Spine-and-Leaf Architecture: Design Overview," White Paper, 2016, Cisco Systems, Inc., San Jose, CA (twenty-seven pages).
Halpern and Pignataro, "Service Function Chaining (SFC) Architecture," Oct. 2015, RFC 7665, The Internet Society, Reston, VA, USA (thirty-two pages).
Quinn et al., "Network Service Header (NSH)," Jan. 2018, Jan. 2018, RFC 8300, The Internet Society, Reston, VA, USA (forty pages).
Suichard et al., "NSH and Segment Routing Integration for Service Function Chaining (SFC)," Jun. 18, 2018, draft-guichard-sfc-nsh-sr-02, The Internet Society, Reston, VA, USA (fifteen pages).
Kumar et al., "Service Function Simple Offloads," Apr. 2, 2017, draft-ietf-sfc-offloads-00, The Internet Society, Reston, VA, USA (seventeen pages).
"Internet Protocol," Sep. 1981, RFC 791, The Internet Society, Reston, VA, USA (forty-five pages).
Farinacci et al., "Generic Routing Encapsulation (GRE)," Mar. 2000, RFC 2784, The Internet Society, Reston, VA, USA (nine pages).
Brockners et al., "Proof of Transit," Oct. 30, 2016, draft-brockners-proof-of-transit-02, The Internet Society, Reston, VA, USA (twenty-three pages).
Brockners et al., "Proof of Transit," May 7, 2018, draft-brockners-proof-of-transit-05, The Internet Society, Reston, VA, USA (twenty-three pages).
Brockners et al., "Proof of Transit," Oct. 1, 2018, draft-ietf-sfc-proof-of-transit-01, The Internet Society, Reston, VA, USA (twenty-five pages).

\* cited by examiner

**NORMAL OR DEPARTURE
PACKET PROCESSING

VERIFICATION PROCESSING

**NORMAL/DEPARTURE PROCESSING
BACKUP ROUTE

NORMAL PROCESSING - SERVICE OFFLOAD

DEPARTURE PROCESSING - SERVICE OFFLOAD

**NORMAL/DEPARTURE
INTRA-NODE PACKET PROCESSING ated scope of the appended claims. In other words, each of
the claims individually recites an aspect of the embodiment
in its entirety. Moreover, some embodiments described may
include, but are not limited to, inter alia, systems, networks,
integrated circuit chips, embedded processors, ASICs,
methods, and computer-readable media containing instructions. The embodiments described hereinafter embody various aspects and configurations, with the figures illustrating
exemplary and non-limiting configurations. Note, computer-readable media and means for performing methods and
processing block operations (e.g., a processor and memory
or other apparatus configured to perform such operations)
are disclosed and are in keeping with the exten-

USING IN-BAND OPERATIONS DATA TO SIGNAL PACKET PROCESSING DEPARTURES IN A NETWORK

TECHNICAL FIELD

The present disclosure relates generally to improved processing of packets in a packet switching network, including, but not limited to, using in-band signaling to communicate departure or normal processing of corresponding packet(s).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
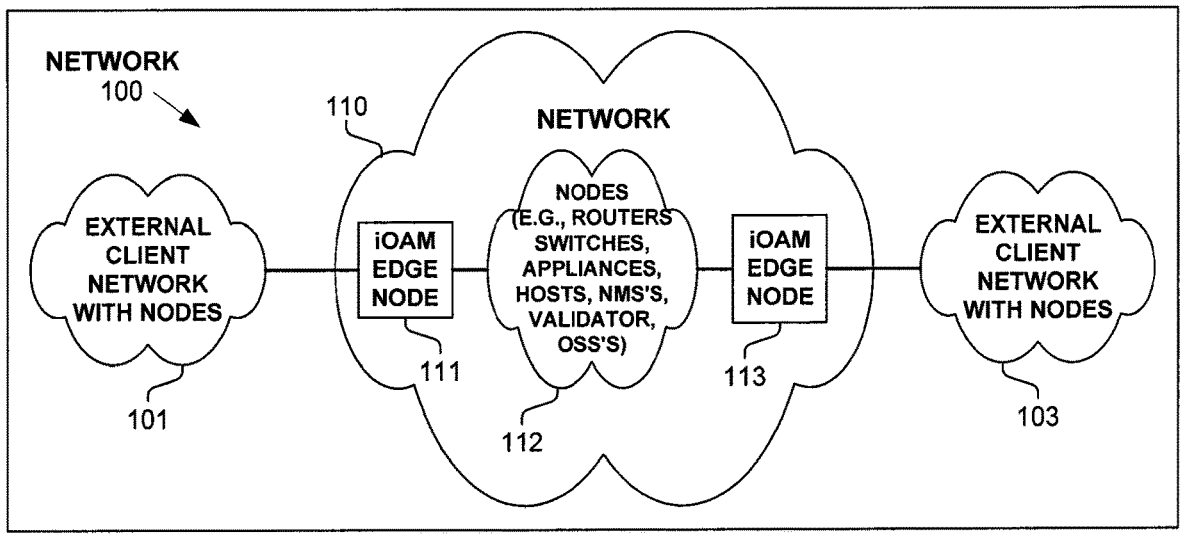
FIG. 1A illustrates a network operating according to one embodiment.

Disclosed are, inter alia, methods, apparatus, computer-storage media, mechanisms, and means associated with using in-band operations data to signal packet processing departures in a network.

In one embodiment, a network packet processes a particular packet, that includes causing the particular packet to traverse multiple nodes. These nodes include multiple traversal identifying nodes. The particular packet comprises a header that includes an operations data field. In one embodiment, each particular traversal identifying node updates the operations data field to identify that the particular packet traversed the particular traversal identifying node, such that, after all of the traversal identifying nodes have updated the operations data field, the operations data field of the particular packet includes operations data evidencing node traversal of the particular packet through each of the plurality of traversal identifying nodes.

In one embodiment, this packet processing includes in response to a particular node determining to perform departure processing, rather than normal processing, of the particular packet: the particular node signals said departure processing of the particular packet in the operations data field and performs the departure processing of the particular packet.

Departure processing is processing of the particular packet that is different than normal processing of the particular packet according to an established rule or procedure. Examples of departure processing include, but are not limited to, forwarding the particular packet according to a backup (e.g., fast reroute) path instead of a primary path; service offloading to Service Function Forwarder instead of processing by a Service Function; and performing exception processing of a packet, such as, but not limited to, punting the packet to slow path processing (e.g., including by a central processing unit), instead of normal, fast path, hardware processing.

In one embodiment, this signaling is used by a verification device to select among multiple verification data to validate the proof of transit (PoT) information contained in an operations data field of the packet. In one embodiment, this verification data includes an ordered list of traversal identifying nodes. In one embodiment, this verification data includes a validation secret.

In one embodiment, a node or apparatus in the network includes one or more processing elements and memory and one or more interfaces sending and receiving packets.

2. Example Embodiments

Disclosed are, inter alia, methods, apparatus, computer-storage media, mechanisms, and means associated with using in-band operations data to signal packet processing departures in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (such as a customer data packet), with a probe packet (e.g., test packet) not being included in the definition of a data packet.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM Data. In one embodiment, the operations data is raw data, processed data, and/or data resulting from processing of other information.

In one embodiment, the operations data is related to data-plane and/or control-plane processing in the network (e.g., in a portion of, or the entire network). In one embodiment, the operations data is related to communication (including, but not limited to, verifying and/or discovering a path taken and/or performance measurement data or results) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

As used herein, "departure" refers to a divergence or deviation, as from an established rule, plan, or procedure. In one embodiment, a departure refers to sending a packet over a backup path; thus, a departure/deviation from sending over a primary path. In one embodiment, a departure refers to offload processing of a packet (e.g., by a Service Function Forwarder or other apparatus); thus, a departure/deviation from processing of a packet by an application processing apparatus (e.g., a Service Function). In one embodiment, a departure refers to exception or punting/slow/software path processing of a packet; thus, a departure/deviation from normal or fast/hardware path processing of a packet.

Cisco Technology, Inc., U.S. patent application Ser. No. 15/975,956, entitled "In-Situ OAM Data Based Segment Routed Path And Service Function Validation," filed May 10, 2018, is hereby incorporated by reference in its entirety (e.g., including figures, specification, and abstract).

Various techniques related to in-band operations data used in network path proof of transit are disclosed by Cisco Technology, Inc., US Patent Application Publications US 2016/0315819 A1, US 2016/0315850 A1, and US 2016/0315921 A1, published Oct. 27, 2016, each of these three publications is hereby incorporated by reference in its entirety.

In one embodiment, meta-data (e.g., a unique number and a cumulative key) is added to each packet as it traverses a service chain or network path. A service chain or network path is described by a set of secret keys, or a set of shares of a single secret. Nodes use their individual keys or shares of a key (e.g., using Shamir's Shared Secret scheme) (typically received from a central controller). The complete key set is only known to the verifier (e.g., an egress operations node, operations support system, verification apparatus). Each checkpoint in the network or a service function in the service chain uses its secret or share of the secret to update the cumulative key. When the verifier receives a packet, it can use its key(s) along with the cumulative key and unique number to validate whether the packet traversed all the checkpoints in the network or all the service function in the service chain. Thus, this PoT information is updated in a same manner independent of a path taken through the network or service chain.

One embodiment disclosed herein provides for the use of individual keys or shares of a key that are different for each network node. The set of keys/shares used for a packet is thus dependent of the normal and departure processing of the packet that changes the set of checkpoints (e.g., traversal identifying nodes) through which the packet traverses. The verifier, typically based on PoT information (identifying normal and departure processing of the packet) acquired from the operations data field of a packet, selects a corresponding set of verification key(s) to use in validating the packet.

In one embodiment, a network node adds departure proof of transit information to the packet to indicate a next transit node to be taken (e.g., directly or indirectly by signaling that departure processing is being performed on the packet including that it is being sent over a backup path). Further, one embodiment includes uses proof of transit data/processing for the node itself when normal processing is performed on a particular packet, which is different proof of transit data/processing for the node itself when departure processing is performed on the packet.

FIG. 1A illustrates a network 100 (e.g., an aggregation of one or more networks of one or more different entities) operating using multiple protocol layers in processing packets (e.g., using overlay and underlay protocols/networks) according to one embodiment. As shown, network 100 includes client networks 101 and 103 (which are the same network in one embodiment) communicatively coupled to a provider network 110. In one embodiment, network 110 uses Segment Routing (SR), Multiprotocol Label Switching (MPLS), tunnels, Ethernet VPN (EVPN), Provider Backbone Bridging EVPN (PBB-EVPN), Internet Protocol version 4 and/or 6 (IP), and/or other encapsulating and/or packet forwarding technology.

In one embodiment, provider network 110 includes provider edge nodes 111 and 113, and a network 112 of network nodes, gateways, service functions, hosts (e.g., end nodes), network management, operations support systems, etc. In one embodiment, provider edge nodes 111 and 113 process packets received from networks 101 and 103, which may include encapsulating or otherwise processing these packets into Segment Routing packets such as by adding a SR header (and possibly another IP header) to these packets according to a data plane ascertained Segment Routing policy, and subsequently decapsulating or removing a Segment Routing header (and possibly another IP header) and forwarding the native (e.g., IP) packets into network 101 and 103. In one embodiment, edge nodes 111 and 113 perform ingress and egress processing of packets, including adding and extracting operations data fields and operations data to packets.

Figure 1B:
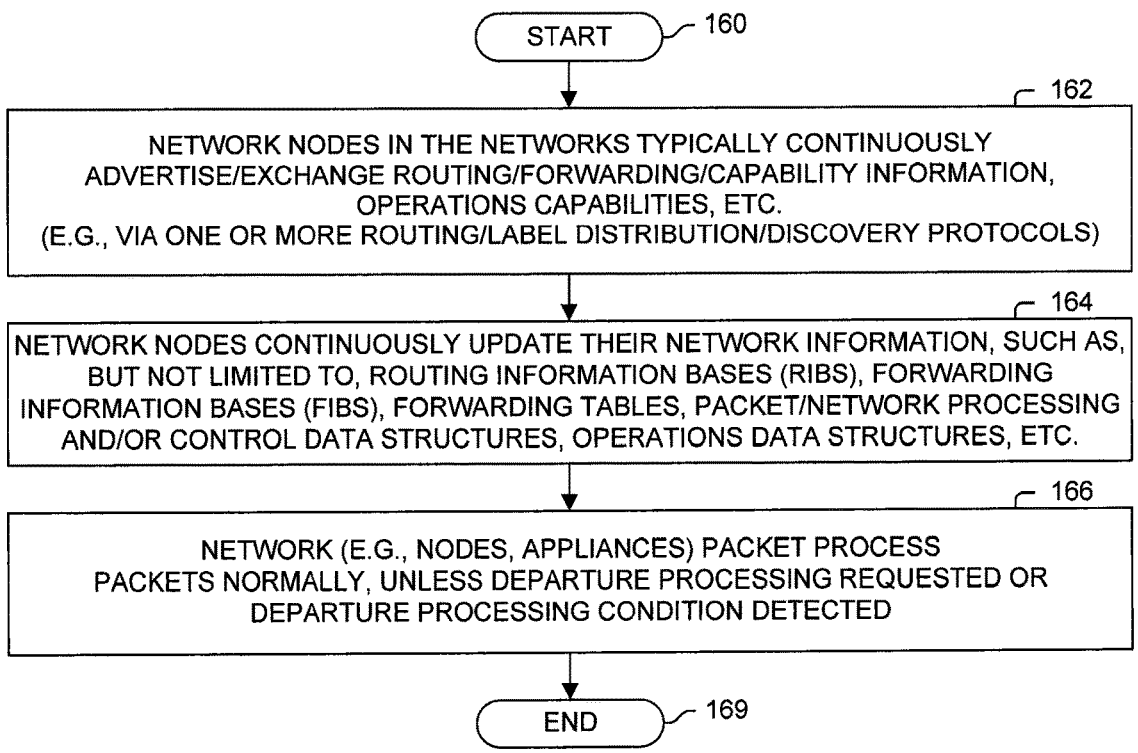
FIG. 1B illustrates a process according to one embodiment.

FIG. 1B illustrates a process according to one embodiment associated with using in-band operations data to signal packet processing departures in a network. Processing begins with process block 160. In process block 162, network nodes in the networks typically continuously advertise/exchange routing, forwarding, capability and information (e.g., including operations capabilities), etc., via one or more routing, label distribution, discovery, signaling and/or other control-plane protocols. In process block 164, the network nodes continuously update their network information, such as, but not limited to, Routing Information Bases (RIBs), Forwarding Information Bases (FIBS), forwarding tables, packet/network processing and/or control data structures, operations data structures, etc. In process block 166, the network (e.g., nodes, routers, appliances thereof) packet processes packets normally, unless departure processing is requested or in response to a detected departure processing condition. Processing of the flow diagram of FIG. 1B is complete as indicated by process block 169.

Figure 2A:
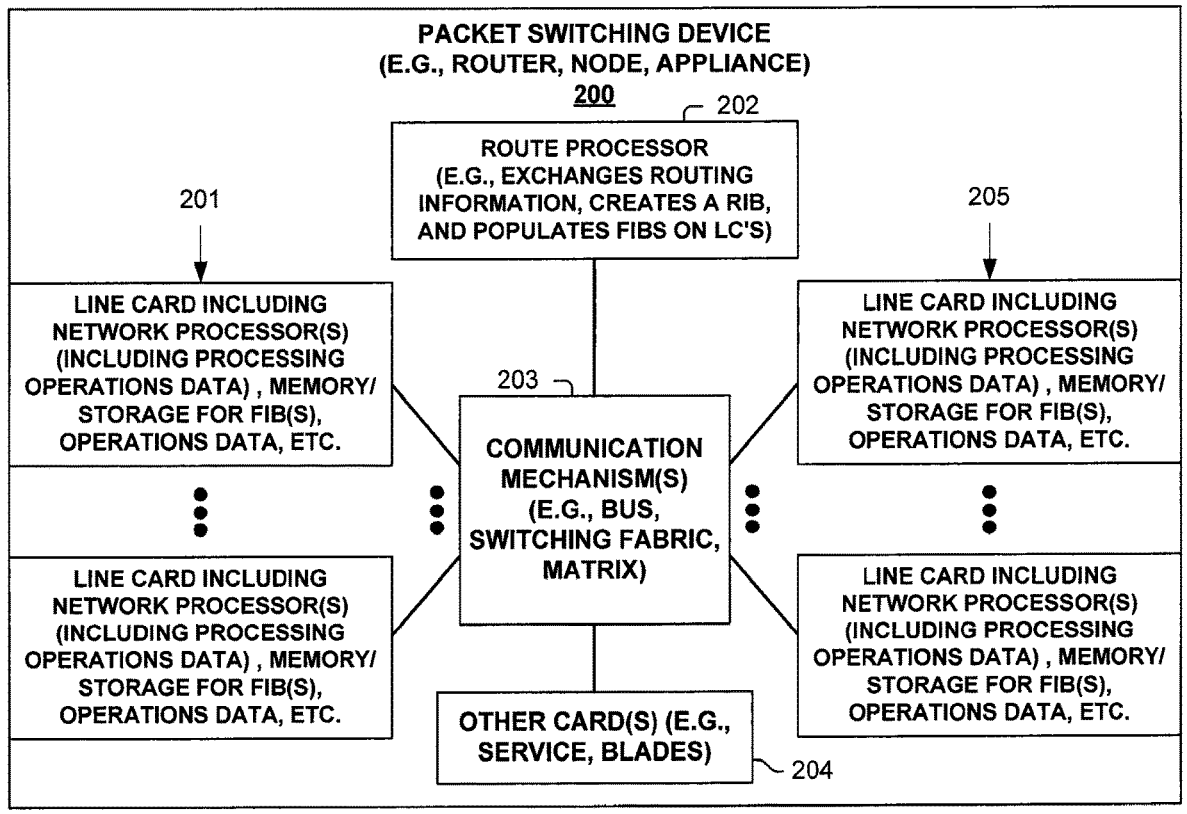
FIG. 2A illustrates a packet switching device according to one embodiment.
Figure 2B:
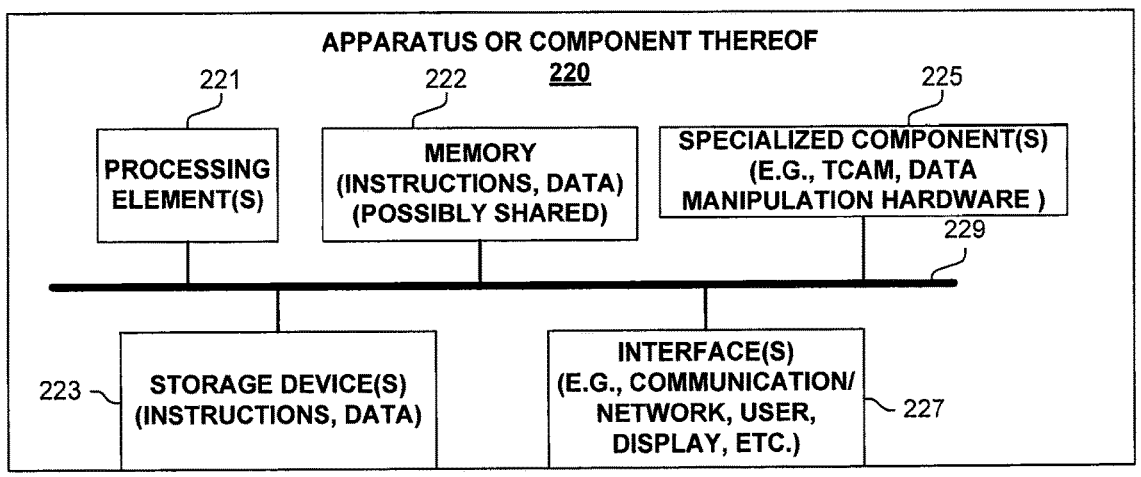
FIG. 2B illustrates an apparatus or component thereof according to one embodiment.

FIGS. 2A-B and their discussion herein provide a description of various network nodes according to one embodiment.

FIG. 2A illustrates one embodiment of a packet switching device 200 (e.g., router, node, switching, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with using in-band operations data to signal packet processing departures in a network. Packet switching device 200 also has a control plane with one or more processing elements (e.g., Route Processor(s)) 202 for managing the control plane and/or control plane processing of packets associated with using in-band operations data to signal packet processing departures in a network. Packet switching device 200 also includes other cards 204 (e.g., service cards, blades) which include processing elements that are used in one embodiment to process (e.g., forward/send, drop, manipulate, change, modify, receive, create, duplicate, perform operations data processing functionality, apply a service according to one or more service functions) packets associated with using in-band operations data to signal packet processing departures in a network, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, operations data processing and storage functions are implemented on line cards 201, 205.

FIG. 2B is a block diagram of an apparatus 220 (e.g., host, router, node, destination, or portion thereof) used in one embodiment associated with using in-band operations data to signal packet processing departures in a network. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit(s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
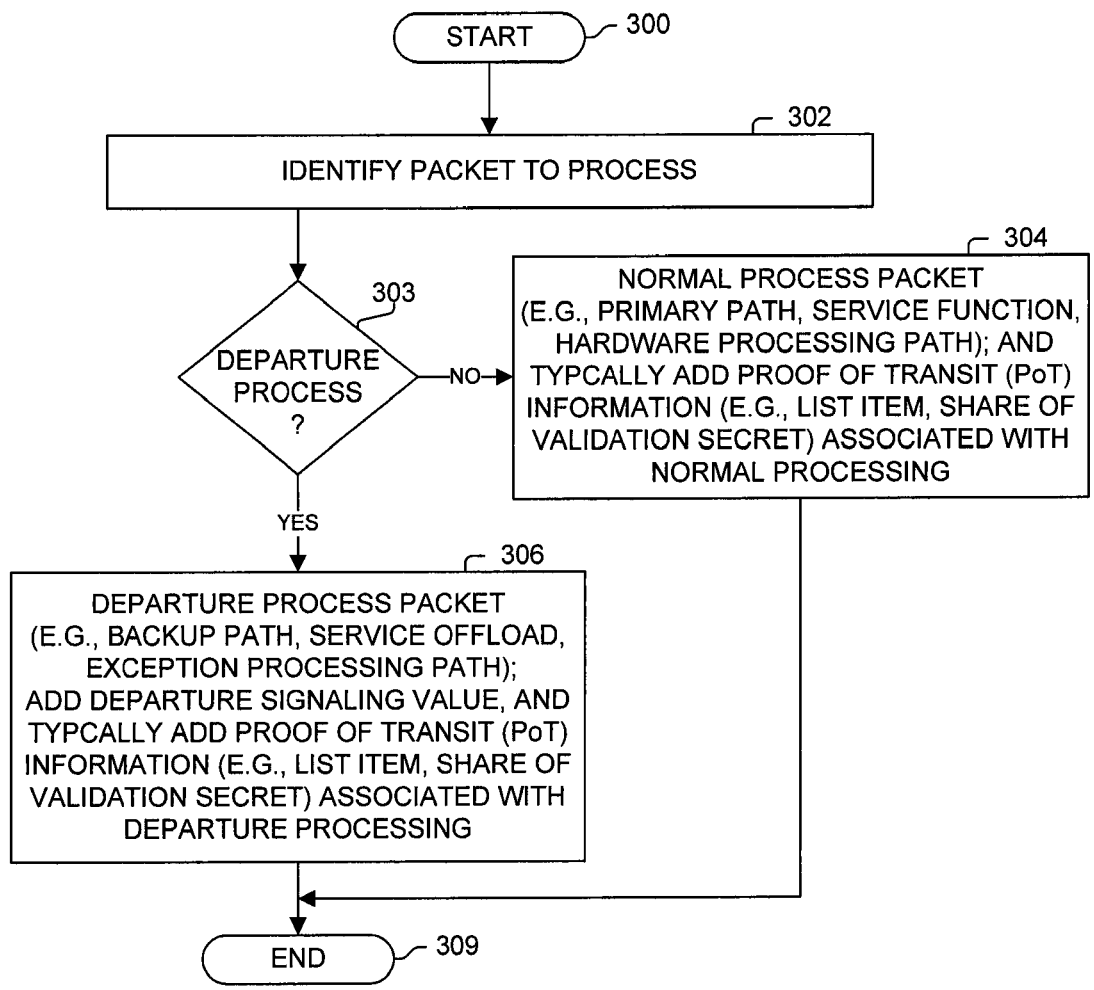
FIG. 3A illustrates a process according to one embodiment.

FIG. 3A illustrates updating information in an operations data field of a packet as performed in one embodiment. Processing begins with process block 300. In process block 302, a packet to process is identified (e.g., received; scheduled; at the front of, or removed from, a processing queue). As determined in process block 303, if departure processing is to be performed, then processing proceeds to process block 306; otherwise normal processing is performed in process block 304.

In process block 304, normal (standard) processing of the packet is performed. In one embodiment, normal processing includes, but is not limited to, sending a packet over a primary path, processing of a packet by a Service Function, processing the packet via a normal hardware processing path, etc. In one embodiment, proof of transit (PoT) information associated with normal processing is added to the operations data field of the packet, with the PoT information including, but not limited to, node identification or normal processing node identification, updating a cumulative secret value based on the node's share of the validation secret or the node's share of the validation secret associated with normal processing by the node. Processing continues to process block 309.

In process block 306, departure (a divergence or deviation from normal/standard processing) processing of the packet is performed. In one embodiment, departure processing includes, but is not limited to, sending a packet over a backup path, offload processing of a packet by a Service Function Forwarder (instead of the Service Function), processing the packet via an exception or slow/punt path, etc. In one embodiment, proof of transit (PoT) information associated with departure processing is added to the operations data field of the packet, with the PoT information including, but not limited to, adding departure signaling information. In one embodiment, departure signaling information includes, but is not limited to, setting a flag, updating a bitmap, adding exception processing node identification. One embodiment also updates a cumulative secret value based on the node's share of the validation secret or the node's share of the validation secret associated with departure processing by the node. Processing continues to process block 309.

Processing of the flow diagram of FIG. 3A is complete as indicated by process block 309.

Figure 3B:
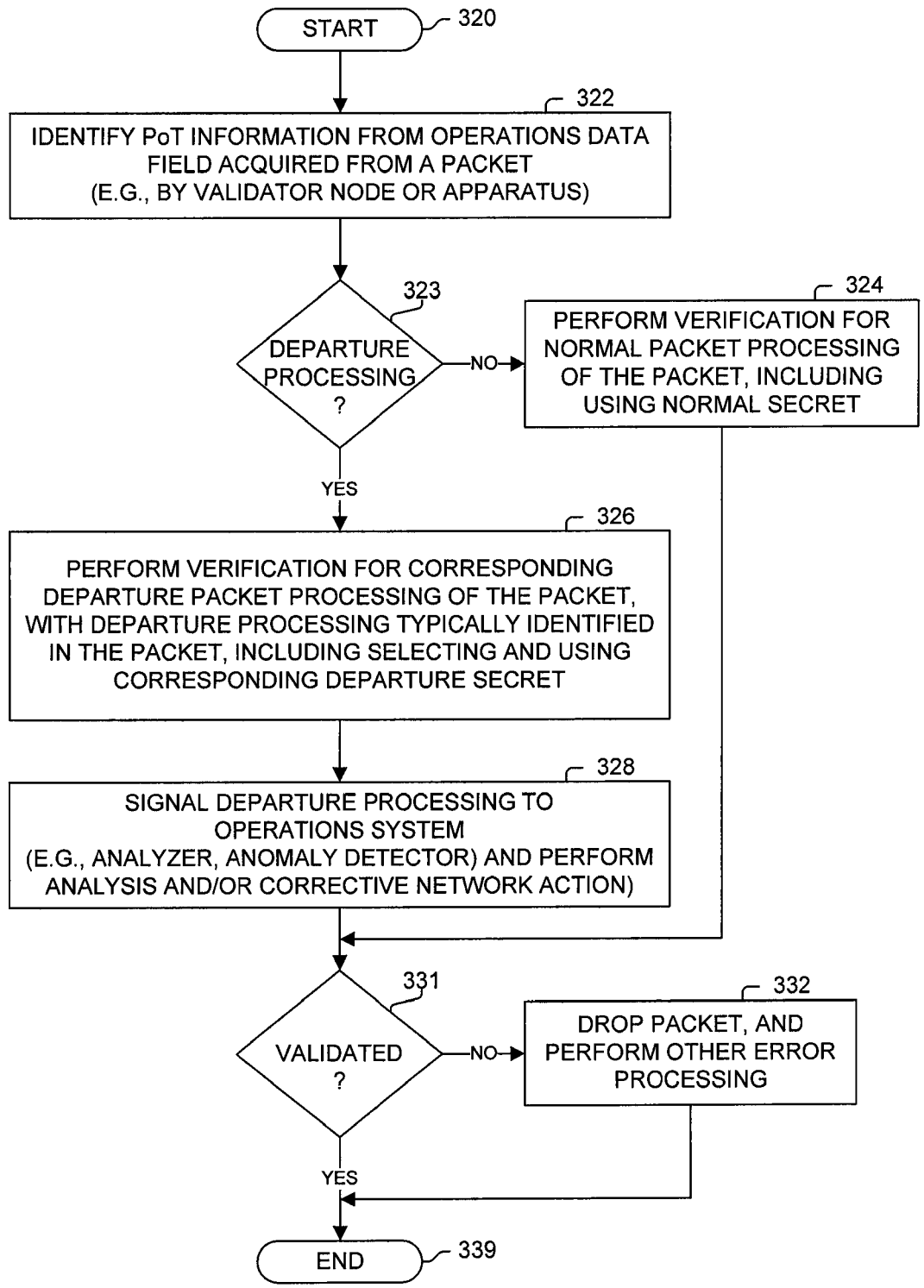
FIG. 3B illustrates a process according to one embodiment.

FIG. 3B illustrates a performing PoT validation processing as performed in one embodiment (e.g., by a validation node or apparatus). Processing begins with process block 320. In process 322, PoT information from operations data field acquired from a packet is identified for processing (e.g., by validator node or apparatus). As determined in process block 323, if departure processing was identified by the PoT information, then processing proceeds to process block 326; otherwise, processing proceeds to process block 324.

In process block 324, verification for normal packet processing of the packet is performed, typically including based on a normal secret (e.g., corresponding to normal packet processing by the network of the packet). Processing proceeds to process block 331.

In process block 326, verification for departure packet processing of the packet is performed, typically including based on a departure secret (e.g., corresponding to departure packet processing by the network of the packet). In one embodiment, the departure secret used depends on one or more departure processing events identified in the information acquired from the operations data field of the packet. In process block 328, the departure processing of the packet is signaled to an operations system (e.g. analyzer, anomaly detector) to perform analysis and/or corrective network action (that is performed in one embodiment). In one embodiment, this information is used to account for the increased number of packets sent over a backup path or lessening of the processing load of a Service Function. Processing proceeds to process block 331.

As determined in process block 331, if the packet was validated in process block 324 or 326 (e.g., the PoT list of nodes identifies a valid path or the cumulative secret matches the selected (normal or departure) secret, then processing proceeds to process block 339; otherwise, error processing is performed in process block 332.

In process block 332, the packet is typically dropped and possibly other error processing is performed. Processing proceeds to process block 339.

Processing of the flow diagram of FIG. 3B is complete as indicated by process block 339.

Figure 4:
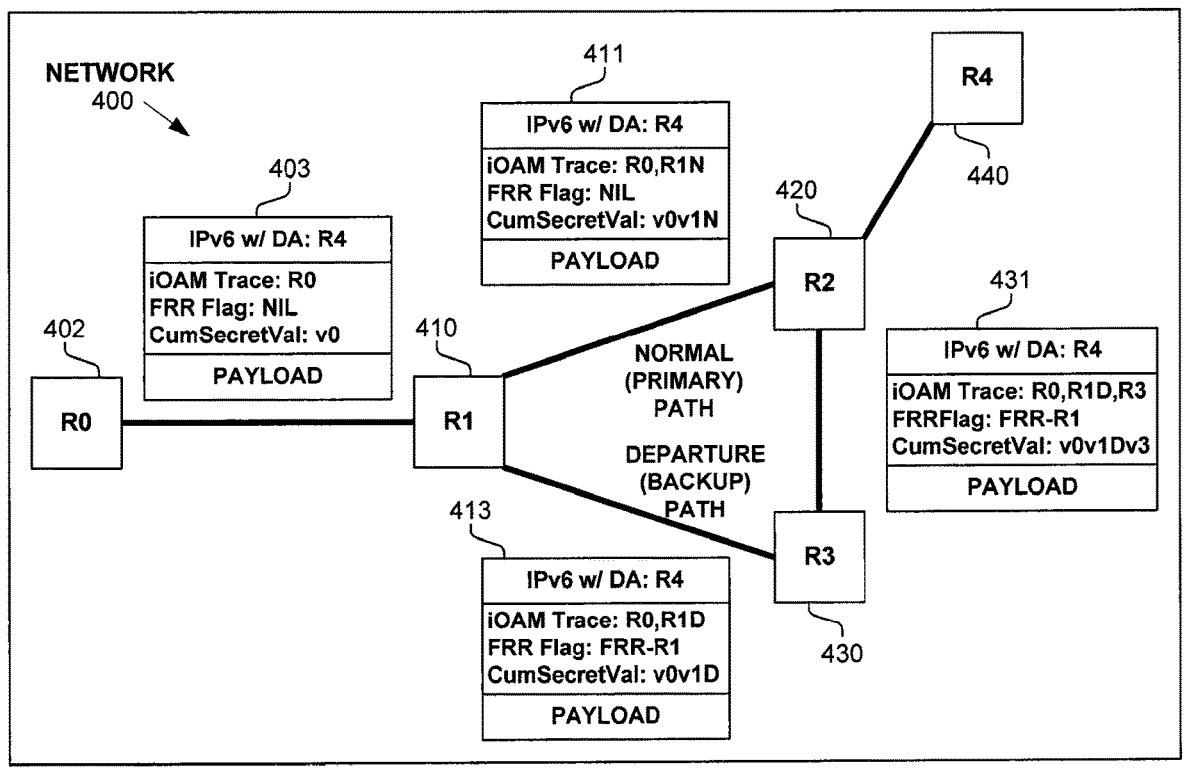
FIG. 4 illustrates a network operating according to one embodiment.

FIG. 4 illustrates a network 400, including nodes R0 (402), R1 (410), R2 (420), R3 (430), and R4 (440), operating according to one embodiment. As shown, a packet (denoted at various positions 403, 411, 413, 431) is sent from R0 (402) to R4 (440) either via:
  normal path that from R1 (410) to R2 (420), or
  backup path from R1 (410) to R3 (430) to R2 (420).

As sent from R0 (402), packet 403 comprises In-situ Operations, Administration, Maintenance (iOAM) data that includes Trace data of R0; a FRR flag of NIL (no departure processing/forwarding has been performed on the packet); and a cumulative secret created based on R0's (402) secret share/key.

In the case of normal processing, R1 (410) sends packet 411 to R2 (420). After sent from R0 (402) packet 403 comprises iOAM data that includes Trace data of R0,R1N; a FRR flag of NIL; and a cumulative secret created based on R0's (402) and R1's (410) secret shares/keys. Packet 411 is forwarded from R2 (420) to R4 (440).

In the case of departure processing, R1 (410) sends packet 413 to R3 (430). After sent from R0 (402) packet 413 comprises iOAM data that includes Trace data of R0,R1D; a FRR flag of FRR-R1 (indicating Fast Reroute/backup path forwarding at node R1); and a cumulative secret created based on R0's (402) and R1's (410) secret shares/keys. Then, R3 (430) sends packet 431 to R2 (420). After sent from R3 (430) packet 431 comprises iOAM data that includes Trace data of R0,R1D, R3; a FRR flag of FRR-R1; and a cumulative secret created based on R0's (402), R1's (410), and R3's (430) secret shares/keys. Packet 431 is forwarded from R2 (420) to R4 (440).

In one embodiment and as shown in FIG. 4, different values are added to the iOAM trace data by a node depending on whether normal or departure processing is performed by the node. However in one embodiment, a same value is added to the iOAM trace data by a node independent of whether normal or departure processing is performed by the node.

In one embodiment and as shown in FIG. 4, different values are used by a node as its secret share/key that depend on whether normal or departure processing is performed by the node. However in one embodiment, a node uses the same secret share/key independent of whether normal or departure processing is performed by the node.

In one embodiment and as shown in FIG. 4, an indication of using a backup path includes an indication of the node that performed this departure processing. However in one embodiment, a single flag is used to indicate if any node used a backup path (e.g., departure processing).

Figure 5A:
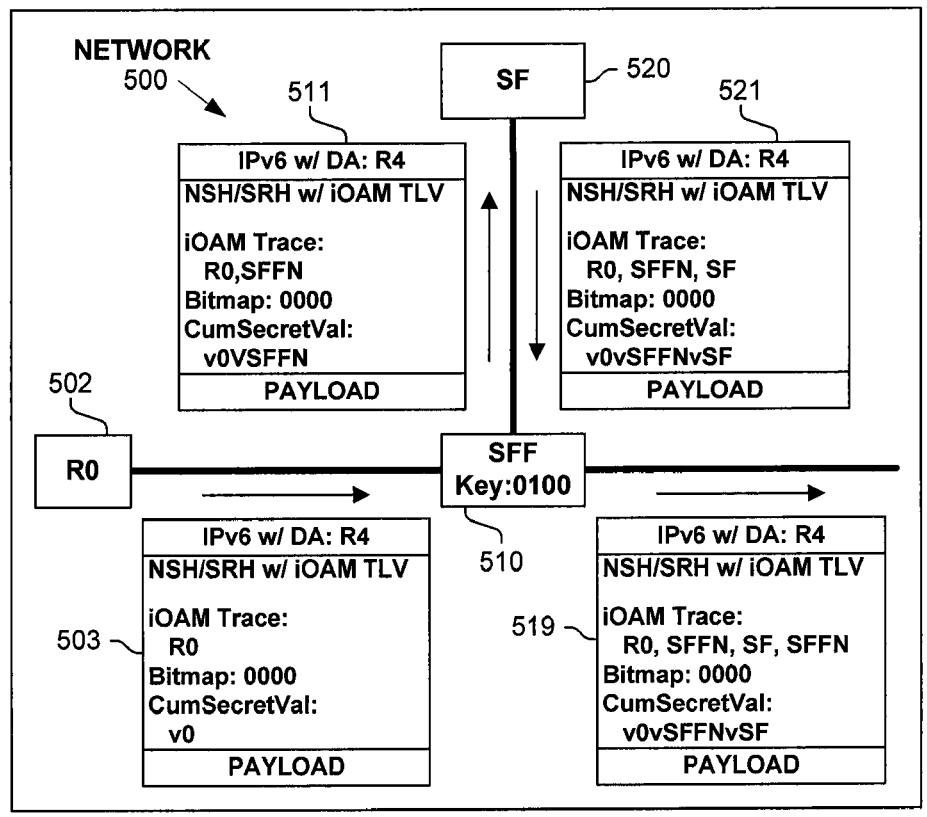
FIG. 5A illustrates a network operating according to one embodiment.

FIG. 5A illustrates a network 500 operating according to one embodiment. As shown, normal processing is performed in that Service Function/SF (520) applies the network service to a packet. As shown, network 500 includes node R0 (502), Service Function Forwarder/SFF (510), and SF 520.

As sent from R0 (502) to SFF (510), packet 503 comprises: iOAM data that includes Trace data of R0; a Bitmap of 0000 (no departure processing/forwarding has been performed on the packet); and a cumulative secret created based on R0's (502) secret share/key.

As sent from SFF (510) to SF (520), packet 511 comprises: iOAM data that includes Trace data of R0,SFFN (normal processing by SFF 510); a Bitmap of 0000 (no departure processing/forwarding has been performed on the packet); and a cumulative secret created based on R0's (502) and SFF's (510) secret shares/keys.

As sent from SF (520) to SFF (510), packet 521 comprises iOAM data that includes Trace data of R0,SFFN,SF (normal processing by SF 520); a Bitmap of 0000 (no departure processing/forwarding has been performed on the packet); and a cumulative secret created based on R0's (502), SFF's (510), SF's (520) secret shares/keys. As sent from SFF (510) towards node R4 (not shown), packet 519 comprises:

iOAM data that includes Trace data of R0,SFFN,SFF, SFFN (normal processing by SFF 510); a Bitmap of 0000 (no departure processing/forwarding has been performed on the packet); and a cumulative secret created based on R0's (502), SFF's (510), SF's (520) secret shares/keys. In one embodiment, the cumulative secret is based on the sequence of R0's (502), SFF's (510), SF's (520), and SFF's (510) secret keys.

Figure 5B:
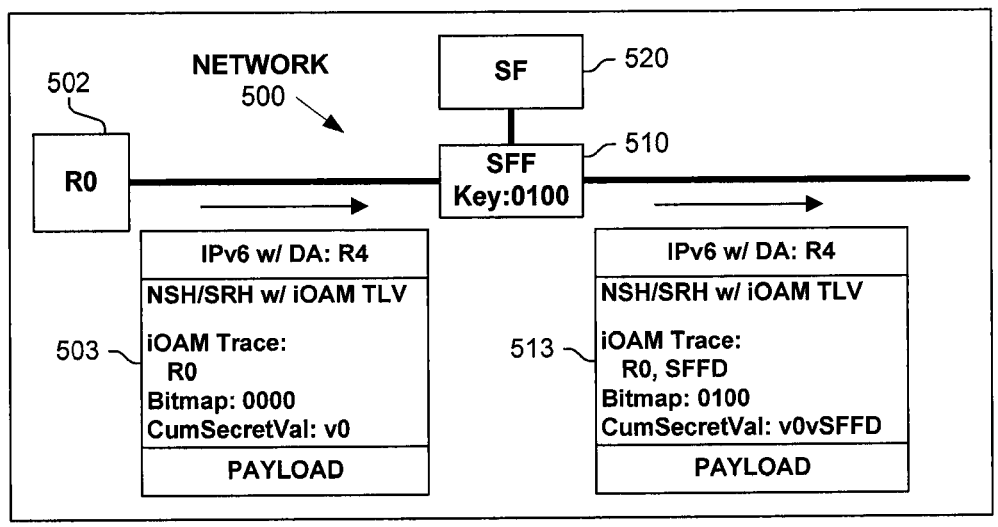
FIG. 5B illustrates a network operating according to one embodiment.

FIG. 5B illustrates network 500 (same network shown in FIG. 5A) operating according to one embodiment. As shown, departure processing is performed in that SFF 510 service offloads the application of the network service packet 503 (instead of by SF 520). As shown in each of FIGS. 5A and 5B, network 500 includes node R0 (502), Service Function Forwarder/SFF (510), and SF 520.

As sent from R0 (502) to SFF (510), packet 503 is the same as described in relation to FIG. 5A and comprises: iOAM data that includes Trace data of R0; a Bitmap of 0000 (no departure processing/forwarding has been performed on the packet); and a cumulative secret created based on R0's (502) secret share/key.

As sent from SFF (510) towards node R4 (not shown), packet 513 comprises: iOAM data that includes Trace data of R0 SFFD (departure processing by SFF 510); a Bitmap of 0100 (a logical OR operation of the bitmap as received in packet 503 with the bit Key (0100) of SFF (510); and a cumulative secret created based on R0's (502) and SFF's (510) secret shares/keys.

In one embodiment and as shown in FIGS. 5A-B, different values are added to the iOAM trace data by a node depending on whether normal or departure processing is performed by the node. However in one embodiment, a same value is added to the iOAM trace data by a node independent of whether normal or departure processing is performed by the node.

In one embodiment and as shown in FIGS. 5A-B, different values are used by a node as its secret share/key that depend on whether normal or departure processing is performed by the node. However in one embodiment, a node uses the same secret share/key independent of whether normal or departure processing is performed by the node.

In one embodiment and as shown in FIGS. 5A-B, an indication of using a backup path includes an indication of the node that performed this departure processing. However in one embodiment, a single flag is used to indicate if any node (e.g., a SFF) performed service offload processing (e.g., departure processing).

Figure 6:
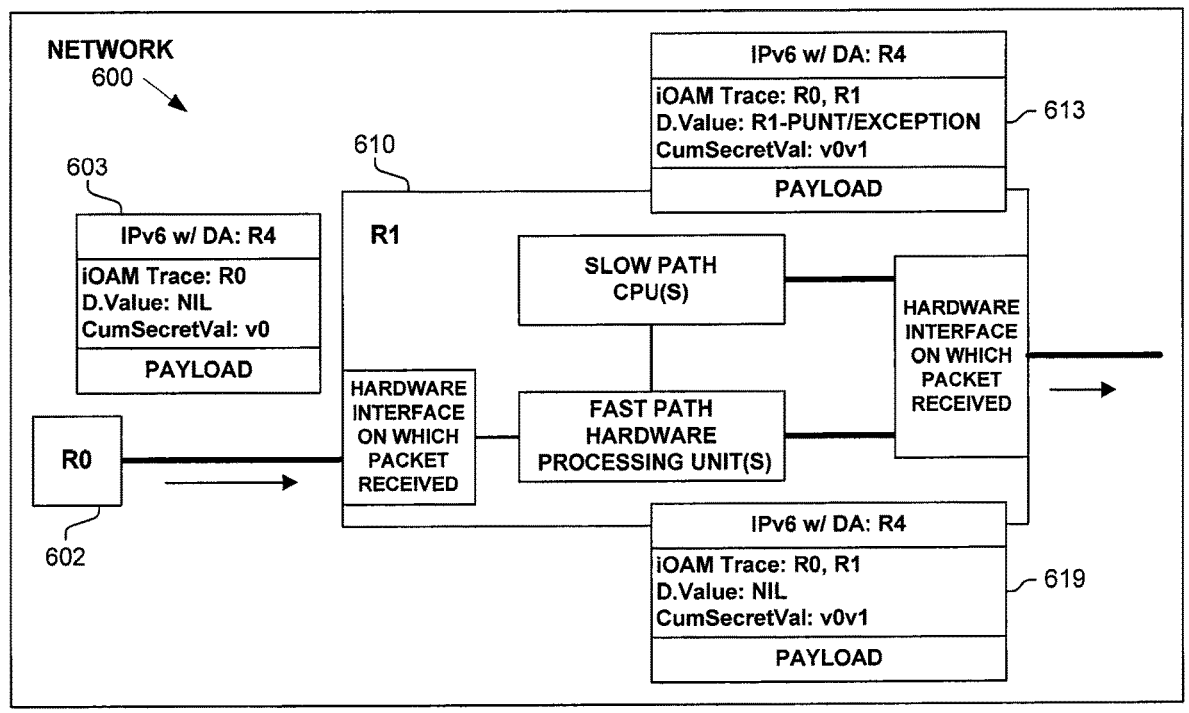
FIG. 6 illustrates a network operating according to one embodiment.

FIG. 6 illustrates a network 600, including nodes R0 (602) and R1 (610), operating according to one embodiment. As shown, a packet (denoted at various positions 603, 613, and 619) is sent from R0 (602) to R4 (not shown) either via intra-node processing by R1 (610) via:

normal/fast path (packet denoted 619), or
departure/slow path (packet denoted 613).

As sent from R0 (602), packet 603 comprises iOAM data that includes Trace data of R0; a departure value (D.Value) of NIL (no departure processing has been performed on the packet); and a cumulative secret created based on R0's (402) secret share/key.

As shown, normal/fast path processed packet 619 sent from node 610 comprises iOAM data that includes Trace data of R0, R1; a departure value (D.Value) of NIL (no departure processing has been performed on the packet); and a cumulative secret created based on R0's and R1's (402) secret shares/keys.

As shown, departure/slow path processed packet 613 sent from node 610 comprises iOAM data that includes Trace data of R0, R1; a departure value (D.Value) indicating departure/punting/exception processing by node R1; and a cumulative secret created based on R0's and R1's (402) secret shares/keys.

In one embodiment and as shown in FIG. 6, a same value is added to the iOAM trace data by a node independent of whether normal or departure processing is performed by the node. However in one embodiment, different values are added to the iOAM trace data by a node depending on whether normal or departure processing is performed by the node.

In one embodiment and as shown in FIG. 6, a same value is used by a node as its secret share/key independent on whether normal or departure processing is performed by the node. However in one embodiment, a node uses different secret shares/keys dependent on whether normal or departure processing is performed by the node.

In one embodiment and as shown in FIG. 6, an indication of departure processing by a node includes an indication of the node that performed this departure processing. However in one embodiment, a single flag is used to indicate if any node performed departure processing.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   packet processing of a particular packet by a network that includes causing the particular packet to traverse a plurality of nodes in the network, with the plurality of nodes including a plurality of traversal identifying nodes, and with the particular packet including a header comprising an operations data field;

wherein said packet processing includes each particular traversal identifying node of the plurality of traversal identifying nodes updating the operations data field including to identify that the particular packet traversed said particular traversal identifying node; and wherein after all of the plurality of traversal identifying nodes have updated the operations data field, the operations data field of the particular packet includes operations data evidencing node traversal of the particular packet through each of the plurality of traversal identifying nodes;

wherein said packet processing includes in response to a particular node of the plurality of traversal identifying nodes determining to perform departure processing of the particular packet: the particular node signaling said departure processing of the particular packet in the operations data field of the particular packet, and performing said departure processing of the particular packet; wherein said departure processing is processing of the particular packet that is different than normal processing of the particular packet according to an established rule or procedure; and wherein the method further includes:

receiving the particular packet by a verification device, with said received particular packet including said operations data evidencing node traversal of the particular packet through each of the plurality of traversal identifying nodes; and in response to said operations data of said received particular packet indicating said departure processing, validation processing of said operations data evidencing node traversal of the particular packet using departure processing proof of transit verification data for the particular packet rather than different normal processing proof of transit verification data for the particular packet.

2. The method of claim 1, wherein the operations data field includes a cumulative secret value; and wherein said updating the operations data field by each particular traversal identifying node of the plurality of traversal identifying nodes includes updating the cumulative secret value based on said particular traversal identifying node's share of a validation secret or an individual secret of said particular traversal identifying node; and wherein said validation processing is based on the cumulative secret value obtained from the said received particular packet by the verification device.

3. The method of claim 2, wherein the validation secret and said share of the validation secret or said individual secret are created according to Shamir's Secret Sharing Scheme.

4. The method of claim 3, wherein the plurality of traversal identifying nodes includes the particular node; wherein the particular node is assigned its respective said share of the validation secret or the individual secret to use in response to said determination to perform departure processing; and wherein the particular node is assigned a second share of a normal validation secret or a second individual secret to use in response to determining not to perform departure processing but rather to perform normal processing.

5. The method of claim 2, wherein said departure processing includes forwarding the particular packet over a backup path, and said normal processing includes forwarding the particular packet over a primary path.

6. The method of claim 5, wherein the backup path is a Fast Reroute (FRR) path; and wherein said modifying the operations data field includes setting a FRR Flag, with the set FRR Flag said signaling said departure processing.

7. The method of claim 2, wherein said departure processing includes the particular node performing a particular service on the particular packet, and said normal processing includes forwarding the particular packet to a service function; and wherein the method includes the service function performing the particular service on the particular packet.

8. The method of claim 7, wherein the particular node is a Service Forwarding Forwarder (SFF).

9. The method of claim 8, wherein the particular node signaling said departure processing includes setting or clearing a particular bit in an SFF bitmap, wherein the particular bit corresponds to the particular node.

10. The method of claim 1, wherein said updating the operations data field including to identify that the particular packet traversed said particular traversal identifying node includes adding an identifying value of said particular traversal identifying node to the operations data field; wherein the plurality of traversal identifying nodes includes the particular node; and wherein the identifying value of the particular node said added to the operations data field also provides said signaling of said departure processing, and not normal processing, of the particular packet.

11. The method of claim 10, wherein the identifying value of the particular node said added to the operations data field is a node-identifier departure-processing value which is different than a node-identifier normal-processing value of the particular node.

12. The method of claim 1, wherein said departure processing includes forwarding the particular packet over a backup path, and said normal processing includes forwarding the particular packet over a primary path.

13. The method of claim 1, wherein said departure processing includes the particular node performing a particular service on the particular packet, and said normal processing includes forwarding the particular packet to a service function; and wherein the method includes the service function performing the particular service on the particular packet.

14. The method of claim 1, wherein said departure processing includes punting of the particular packet for exception processing within a particular router of the network, and said normal processing includes processing via a normal hardware processing path within the particular router of the network.

15. The method of claim 1, wherein the plurality of nodes includes one or more nodes in addition to the plurality of traversal identifying nodes.

16. The method of claim 1, wherein the operations data field is an In-situ Operations, Administration, and Maintenance (IOAM) data field.

17. The method of claim 1, wherein said operations data evidencing node traversal of the particular packet through each of the plurality of traversal identifying nodes and said operations data of said received particular packet indicating said departure processing are stored in different portions of the operations data field of the particular packet.

18. The method of claim 17, wherein said operations data of said received particular packet indicating said departure processing includes a flag, a bitmap, or other signaling value.

19. The method of claim 18, wherein said operations data of said received particular packet indicating said departure processing identifies each of the plurality of traversal identifying nodes that performed said departure processing.

20. The method of claim 18, wherein said operations data of said received particular packet indicating said departure processing identifies does not identify which one or more nodes performed said departure processing.

21. The method of claim 1, wherein the plurality of nodes includes the verification device.

22. A system, comprising:
a plurality of nodes in a network, with each of the plurality of nodes packet processing a particular packet including causing the particular packet to traverse the plurality of nodes in the network, with the plurality of nodes including a plurality of traversal identifying nodes and a verification device, and with the particular packet including a header comprising an operations data field;
wherein said packet processing includes each particular traversal identifying node of the plurality of traversal identifying nodes updating the operations data field including to identify that the particular packet traversed said particular traversal identifying node; and wherein after all of the plurality of traversal identifying nodes have updated the operations data field, the operations data field of the particular packet includes operations data evidencing node traversal of the particular packet through each of the plurality of traversal identifying nodes;
wherein said packet processing includes in response to a particular node of the plurality of traversal identifying nodes determining to perform departure processing of the particular packet: the particular node signaling said departure processing of the particular packet in the operations data field of the particular packet, and performing said departure processing of the particular packet; wherein said departure processing is processing of the particular packet that is different than normal processing of the particular packet according to an established rule or procedure; and
wherein the particular packet is received by the verification device, with said received particular packet including said operations data evidencing node traversal of the particular packet through each of the plurality of traversal identifying nodes; and wherein in response to said operations data of said received particular packet indicating said departure processing, the verification device performing validation processing of said operations data evidencing node traversal of the particular packet using departure processing proof of transit verification data for the particular packet rather than different normal processing proof of transit verification data for the particular packet.

* * * * *